United States Patent

Nuzzo

Patent Number: 5,868,371
Date of Patent: Feb. 9, 1999

[54] DISPLAY STAND WITH ROLLERS ARRANGED TO ELEVATE AND TO RESIST ACCIDENTAL MOVEMENT BUT TO FACILITATE MANUAL PUSHING, PULLING, OR TURNING MOVEMENT

[75] Inventor: Joseph V. Nuzzo, Willowbrook, Ill.

[73] Assignee: Container Graphics & Display, Inc., Villa Park, Ill.

[21] Appl. No.: 604,492

[22] Filed: Feb. 21, 1996

Related U.S. Application Data

[63] Continuation-in-part of Ser. No. 500,316, Jul. 10, 1995.

[51] Int. Cl.⁶ .................................................... A47B 91/00
[52] U.S. Cl. ...................... 248/346.01; 108/189; 211/135
[58] Field of Search .......................... 248/346.01, 188.1, 248/188.2, 188.8, 129, 128, 188.9; 211/149, 151, 132, 186, 195; 108/189, 176; 312/249.13, 257.1; 280/47.26, 652, 47.24, 47.34, 47.35, 79.11, 179.3

[56] References Cited

U.S. PATENT DOCUMENTS

| 1,545,165 | 7/1925 | O'Connor . | |
|---|---|---|---|
| 3,285,620 | 11/1966 | Mitty et al. | 280/47.26 |
| 3,719,408 | 3/1973 | Fullington et al. | 312/236 |
| 4,311,222 | 1/1982 | Castanier | 190/18 |
| 5,005,848 | 4/1991 | Cornell | 280/79.11 |
| 5,040,690 | 8/1991 | van der Schoot | 211/135 |
| 5,197,578 | 3/1993 | Van Hooreweder | 190/18 A |
| 5,213,220 | 5/1993 | McBride | 211/132 |
| 5,377,795 | 1/1995 | Berman | 190/18 A |
| 5,379,870 | 1/1995 | Sadon | 190/18 |
| 5,392,902 | 2/1995 | Vlastakis | 206/45 |
| 5,511,806 | 4/1996 | McNair | 280/47.2 |

FOREIGN PATENT DOCUMENTS 2630410  10/1989  France .

Primary Examiner—Leslie A. Braun
Assistant Examiner—Anita M. King
Attorney, Agent, or Firm—Rockey, Milnamow & Katz, Ltd.

[57] ABSTRACT

A display stand has a front wall, a back wall, and two side walls defining four lower corners of the display stand. Near each lower corner, the display stand is equipped with a base, which is equipped with a first roller mounted to the base so as to be freely rotatable about a generally horizontal axis and with a second roller mounted to the base so as to be freely rotatable about a generally horizontal axis. The axes about which the first rollers are rotatable are perpendicular to the axes about which the second rollers are rotatable. Each of the first rollers is located beneath a respective one of the side walls, near a respective one of the front and back walls. Each of the second rollers is located beneath a respective one of the front and back walls, near a respective one of the side walls. Being so arranged, the rollers elevate the display stand above a floor and resist accidental movement of the display stand, as on a sloping floor, but facilitate manual pushing, pulling, or turning movement of the display stand.

4 Claims, 2 Drawing Sheets

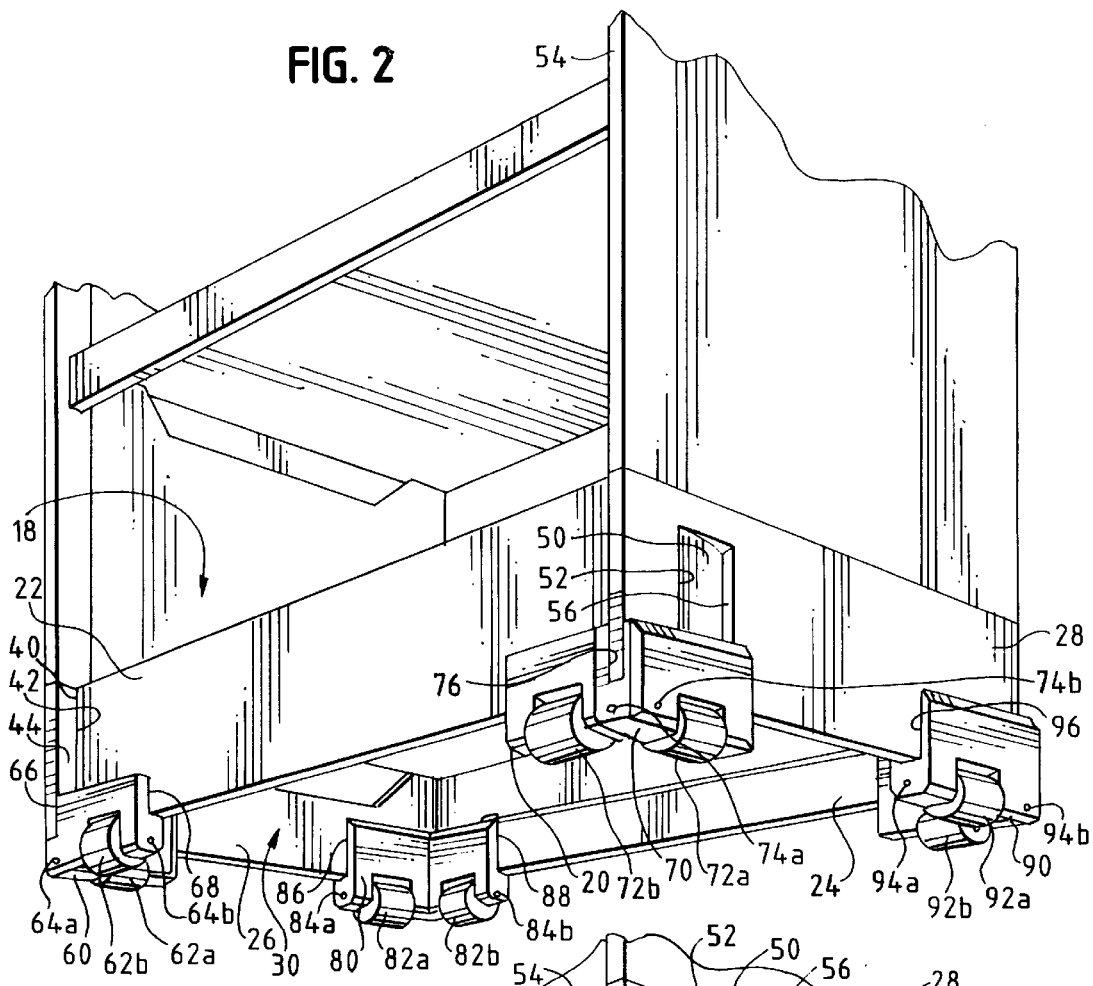
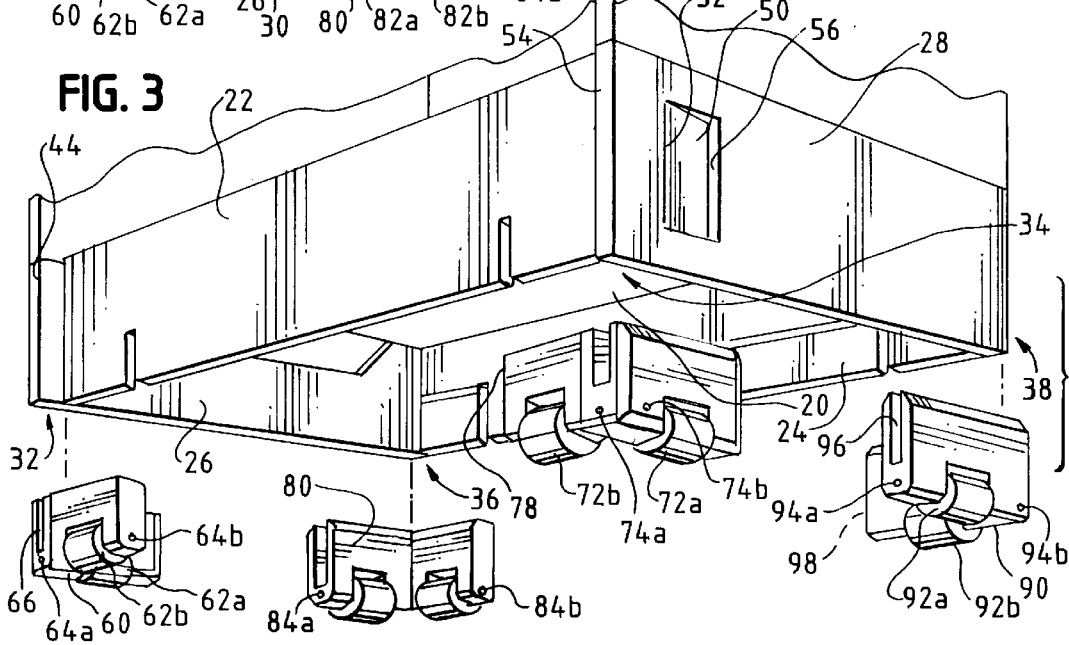

DISPLAY STAND WITH ROLLERS ARRANGED TO ELEVATE AND TO RESIST ACCIDENTAL MOVEMENT BUT TO FACILITATE MANUAL PUSHING, PULLING, OR TURNING MOVEMENT

CROSS-REFERENCE TO RELATED APPLICATION

This application is a continuation-in-part of U.S. patent application Ser. No. 08/500,316 which was filed on Jul. 10, 1995, and the disclosure of which is incorporated herein by reference.

TECHNICAL FIELD OF THE INVENTION

This invention pertains to a display stand of a type having a front wall, a back wall, and two side walls with the front, back, and side walls defining four lower corners of the display stand. The display stand is equipped at such lower corners with rollers arranged to elevate the display stand and to resist accidental movement of the display stand, as along a sloping floor, but to facilitate manual pushing, pulling, or turning movement of the display stand.

BACKGROUND OF THE INVENTION

Standing on floors in supermarkets, home centers, and other retail establishments, display stands of the type noted above are in widespread use to display food products, hardware products, and other merchandise. Commonly, such display stands made are made wholly or predominantly from corrugated paperboard, on which advertising graphics are printed.

If made wholly or predominantly from corrugated paperboard, a display of the type noted above tends to wick water from its lower edges so as to lose its structural integrity when a floor on which the display stand is standing is cleaned. Also, such a display stand tends to be readily damaged at its lower edges if struck by a cleaning appliance, such as a floor buffer. Generally, as known heretofore, such a display stand has been regarded as having a useful life not longer than about four to eight weeks.

A display stand of the type noted above may carry as much as one hundred fifty pounds of displayed merchandise. Consequently, it can be very difficult to push, pull, or turn such a display stand carrying displayed merchandise without stressing its lower edges and risking damage to its structural integrity.

SUMMARY OF THE INVENTION

This invention provides a display stand of the type noted above with rollers in a unique arrangement to elevate the display stand and to resist accidental movement of the display stand, as along a sloping floor, but to facilitate manual pushing, pulling, or turning movement of the display stand.

Being of the type noted above, the display stand has at least three walls defining at least three lower corners of the display stand. The display stand may comprise four walls defining four lower corners of the display stand. The walls may be mutually perpendicular. This invention equips the display stand near each of such lower corners with a base mounted to at least one of such walls. Each base is equipped with a roller mounted so as to be freely rotatable about a generally horizontal axis. Each of at least two of the bases is equipped with a second roller mounted so as to be freely rotatable about a generally horizontal axis.

Broadly, this invention contemplates a unique arrangement wherein the axes about which the first rollers are rotatable intersect the axes about which the second rollers are rotatable. Preferably, each base is equipped with a first roller and with a second roller, each as described above. Preferably, if the display stand has four walls, the axes about which the first rollers are rotatable are perpendicular to the axes about which the second rollers are rotatable.

In one contemplated embodiment, in which the display stand has four walls that are designated respectively as a front wall, a back wall, and two side walls, each of the first rollers is located beneath a respective one of the side walls, nearer a respective one of the front and back walls, and each of the second rollers is located beneath a respective one of the front and back walls, nearer a respective one of the side walls.

These and other objects, features, and advantages of this invention are evident from the following description of a preferred embodiment of this invention and two modified embodiments with reference to the accompanying drawings.

BRIEF DESCRIPTION OF THE DRAWINGS

FIG. 2, on a somewhat enlarged scale, is a fragmentary, perspective view of the lower portion and the rollers, as viewed from a lower, outer vantage.

FIG. 3 is a fragmentary, perspective, exploded view of the lower portion, the rollers, and bases associated with the rollers, as shown in FIG. 2.

DETAILED DESCRIPTION OF THE ILLUSTRATED EMBODIMENT

Figure 1:
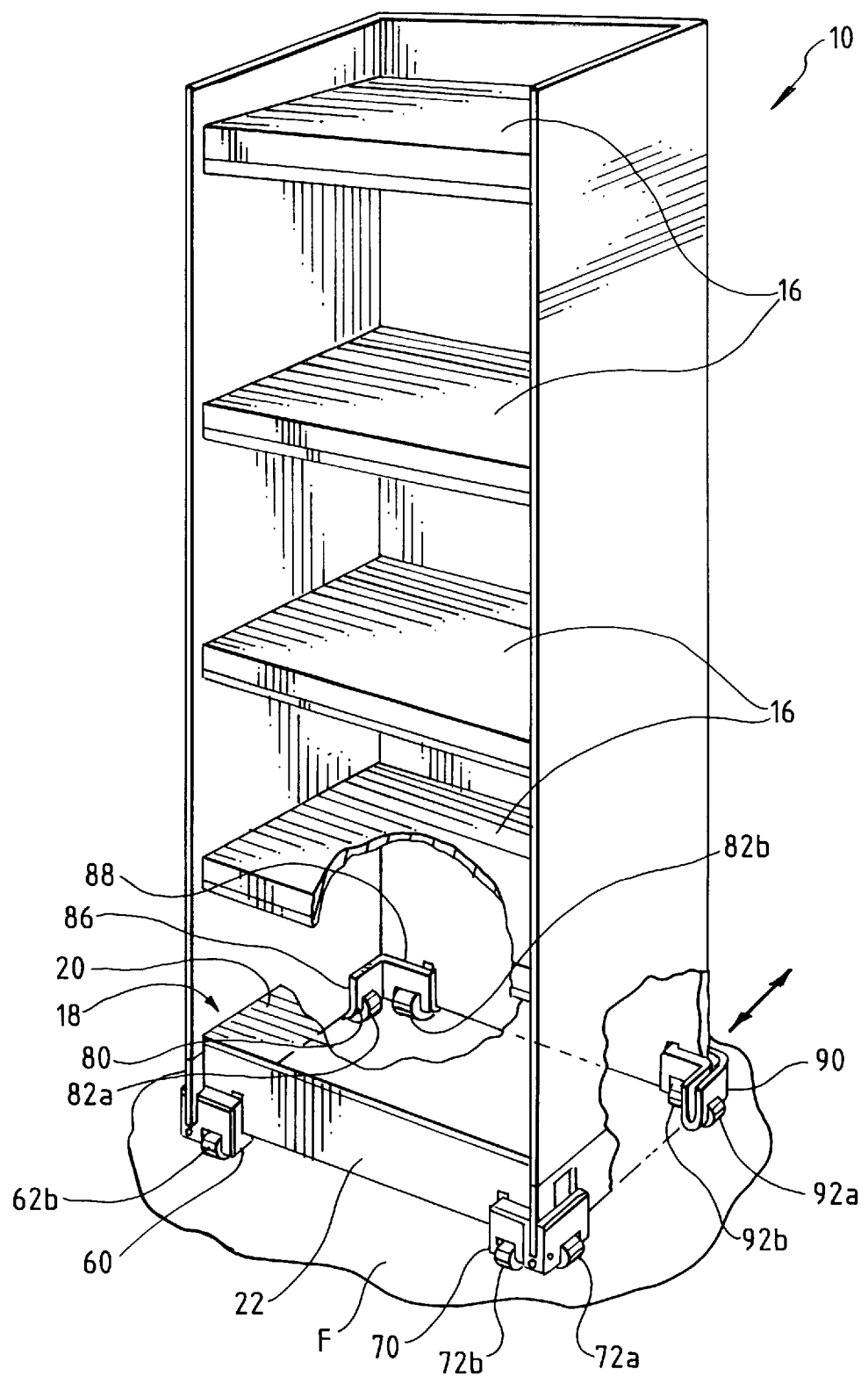
FIG. 1 is a perspective view of a display stand, as equipped with rollers in a unique arrangement so as to constitute a preferred embodiment of this invention, and as viewed from an upper, outer vantage.

As illustrated and described below, a display stand 10 equipped with four pairs of rollers constitutes a preferred embodiment of this invention. The rollers and the bases, both of which are to be later described, are arranged to elevate the display stand 10 above a floor F. The rollers are arranged to resist accidental movement of the display stand 10, as along the floor F if the floor F happens to slope slightly, but to facilitate manual pushing, pulling, or turning movement of the display stand 10 along the floor F.

The display stand 10 is made wholly or predominantly from corrugated paperboard, which is diecut, folded, and secured adhesively and via tabs inserted into slots, as described below, so as to provide four upper shelves 16 and a lower platform 18. The lower platform 18 has an upper wall 20, a front wall 22, a back wall 24, and two side walls, namely a left wall 26 and a right wall 28. The walls 22, 24, 26, 28, are comprised of plural layers of corrugated paperboard folded along their lowermost edges and define four lower corners at an open bottom 30 of the display stand 10, namely a front, left, lower corner 32, a front, right, lower corner 34, a back, left lower corner 36, and a back, right, lower corner 38.

The front wall 22 has a tab 40 extending outwardly through a vertical slot 42 in the left wall 26, a strip 44 of which extends frontwardly beyond the vertical slot 42, backwardly along the left wall 26, and inwardly through a vertical slot 46 in the left wall 26. The front wall 22 has a tab 50 extending outwardly through a vertical slot 52 in the right wall 28, a strip 54 of which extends frontwardly beyond the vertical slot 52, backwardly along the right wall 28, and inwardly through a vertical slot 56 in the right wall 28.

Except for the rollers and the bases, and except for certain slots to be later described at the lower edges of the lower platform 18, the display stand 10 is similar to display stands available commercially from various sources including Container Graphics & Display, Inc. of Villa Park, Ill.

Near the front, left, lower corner 32, the display stand 10 is equipped with a base 60 mounted to the front wall 22 and to the left wall 26. The base 60 is equipped with a first roller 62a mounted to the base 60 via an axle pin 64a so as to be freely rotatable about a generally horizontal axis defined by the axle pin 64a and with a second roller 62b mounted to the base 60 via an axle pin 64b so as to be freely rotatable about a generally horizontal axis defined by the axle pin 64b. The generally horizontal axes defined by the axle pins 64a, 64b, are perpendicular to each other.

The base 60 is formed with a groove 66, which snugly receives a lower portion of the strip 44, and which snugly receives a lower portion of the tab 40. The base 60 is formed with a groove 68, which communicates with the groove 66, and which snugly receives a lower portion of the front wall 22, near the left wall 26.

Near the front, right, lower corner 34, the display stand 10 is equipped with a base 70 mounted to the front wall 22 and to the right wall 28. The base 70 is equipped with a first roller 72a mounted to the base 70 via an axle pin 74a so as to be freely rotatable about a generally horizontal axis defined by the axle pin 74a and with a second roller 72b mounted to the base 70 via an axle pin 74b so as to be freely rotatable about a generally horizontal axis defined by the axle pin 74b. The generally horizontal axes defined by the axle pins 74a, 74b, are perpendicular to each other.

The base 70 is formed with a groove 76, which snugly receives a lower portion of the strip 54, and which snugly receives a lower portion of the tab 50. The base 70 is formed with a groove 78, which communicates with the groove 76, and which snugly receives a lower portion of the front wall 22, near the right wall 28. When viewed from above, the base 60 and the base 70 present mirror images.

Near the back, left, lower corner 36, the display stand 10 is equipped with a base 80 mounted to the back wall 24 and to the left wall 26. The base 80 is equipped with a first roller 82a mounted to the base 80 via an axle pin 84a so as to be freely rotatable about a generally horizontal axis defined by the axle pin 84a and with a second roller 82b mounted to the base 80 via an axle pin 84b so as to be freely rotatable about a generally horizontal axis defined by the axle pin 84b. The generally horizontal axes defined by the axle pins 84a, 84b, are perpendicular to each other.

The base 80 is formed with a groove 86, which snugly receives a lower portion of the left wall 26, near the back wall 24. The base 80 is formed with a groove 88, which communicates with the groove 86, and which snugly receives a lower portion of the back wall 24, near the left wall 26.

Near the back, right, lower corner 38, the display stand 10 is equipped with a base 90 mounted to the back wall 24 and to the right wall 28. The base 90 is equipped with a first roller 92a mounted to the base 90 via an axle pin 94a so as to be freely rotatable about a generally horizontal axis defined by the axle pin 94a and with a second roller 92b mounted to the base 90 via an axle pin 94b so as to be freely rotatable about a generally horizontal axis defined by the axle pin 94b. The generally horizontal axes defined by the axle pins 94a, 94b, are perpendicular to each other.

The base 90 is formed with a groove 96, which snugly receives a lower portion of the right wall 28, near the back wall 24. The base 90 is formed with a groove 98, which communicates with the groove 96, and which snugly receives a lower portion of the back wall 24, near the right wall 28. When viewed from above, the base 90 and the base 80 present mirror images.

The respective bases 60, 70, 80, 90, are retained frictionally on the lower platform 18, so as to be generally reusable along with the respective rollers 62, 72, 82, 92, even if the display stand 10 has expended its useful life, but may be additionally or alternatively secured to the lower platform 18 via rivets or other fasteners or adhesively.

Each of the bases 60, 70, 80, 90, is molded from a suitable polymer, such as nylon 6/6 or high impact polystyrene, preferably in one piece or alternatively in plural pieces welded or joined adhesively or via rivets. Each of the rollers noted above is molded from a suitable polymer, such as nylon 6/6 or high impact polystyrene, preferably in one piece or alternatively in two halves welded or joined adhesively. Steel pins are preferred for the axle pins noted above.

The respective rollers 62, 72, 82, 92, and the respective bases 60, 70, 80, 90, elevate the display stand 10 above the floor F, so as to reduce structural integrity damage due to water wicking from the lower edges of the display stand 10, cleaning appliances striking the display stand 10, or both.

In the unique arrangement provided by this invention, the generally horizontal axes about which the first rollers 62a, 72a, 82a, 92a, are rotatable are perpendicular to the axes about which the second rollers 52b, 72b, 82b, 92b, are rotatable. The first roller 62a is located beneath the left wall 26, near the front wall 22, and the second roller 62b is located beneath the front wall 22, near the left wall 26. The first roller 72a is located beneath the right wall 28, near the front wall 22, and the second roller 72b is located beneath the front wall 22, near the right wall 28. The first roller 82a is located beneath the left wall 26, near the back wall 24, and the second roller 82b is located beneath the back wall 24, near the left wall 26. The first roller 92a is located beneath the right wall 28, near the back wall 24, and the second roller 92b is located beneath the back wall 24, near the right wall 28.

Thus, the first rollers noted above are oriented so as to resist accidental movement of the display stand 10 frontwardly or backwardly but so as to facilitate manually pushing or pulling the display stand 10 sideways in either sideways direction. Also, the second rollers noted above are oriented so as to resist accidental movement of the display stand 10 sideways into either sideways directions but so as to facilitate manually pushing or pulling the display stand 10 frontwardly or backwardly. Moreover, the first and second rollers noted above facilitate manually turning the display stand 10 in either rotational direction.

Various modifications may be made in the preferred embodiment described above without departing from the scope and spirit of this invention. Thus, as an example, the display stand equipped with the respective bases and with the respective rollers may be generally of any size, shape, or style known presently or hereafter.

I claim:

1. A display stand having four downwardly extending walls defining four lower corners at an open bottom of the display stand, the display stand being equipped at each of said lower corners with a base having two upwardly opening grooves communicating with each other, each upwardly opening groove receiving a portion of a respective one of said downwardly extending walls, wherein the base at each of said lower corners is equipped with a first roller mounted to the base so as to be freely rotatable about a generally horizontal axis and with a second roller mounted to the base so as to be freely rotatable about a generally horizontal axis perpendicular to the generally horizontal axis about which the first roller is rotatable, the first and second rollers elevating the display stand, resisting accidental rotation of the display stand, but facilitating manual pushing, pulling, or turning movement of the display stand.

2. The display stand of claim 1 wherein each roller is disposed beneath one of said downwardly extending walls, and wherein the generally horizontal axis about which each roller is rotatable is parallel to the wall beneath which said roller is disposed.

3. The display stand of claim 1 wherein each upwardly opening groove is arranged to retain the received portion of the respective one of said downwardly extending walls frictionally, whereby said base and the first and second rollers with which said base is equipped are reusable if the display stand has expended its useful life.

4. The display stand of claim 2 wherein each upwardly opening groove is arranged to retain the received portion of the respective one of said downwardly extending walls frictionally, whereby said base and the first and second rollers with which said base is equipped are reusable if the display stand has expended its useful life.

\* \* \* \* \*